(12) United States Patent
Uto

(10) Patent No.: US 8,556,329 B2
(45) Date of Patent: Oct. 15, 2013

(54) DOOR PANEL

(75) Inventor: Ryoji Uto, Tokyo (JP)

(73) Assignee: Caterpillar Sarl, Geneva (CH)

( * ) Notice: Subject to any disclaimer, the term of this patent is extended or adjusted under 35 U.S.C. 154(b) by 341 days.

(21) Appl. No.: 12/988,938

(22) PCT Filed: May 27, 2009

(86) PCT No.: PCT/JP2009/059684
§ 371 (c)(1),
(2), (4) Date: Oct. 21, 2010

(87) PCT Pub. No.: WO2010/018704
PCT Pub. Date: Feb. 18, 2010

(65) Prior Publication Data
US 2011/0030279 A1   Feb. 10, 2011

(30) Foreign Application Priority Data
Aug. 13, 2008  (JP) ................................. 2008-208616

(51) Int. Cl.
*B60J 5/00*  (2006.01)
(52) U.S. Cl.
USPC ...................................... 296/146.11; 49/502
(58) Field of Classification Search
USPC ............ 49/502, 381, 397; 296/196.11, 196.5, 296/196.6, 290.11, 146.11, 146.5, 146.6, 296/190.11; 16/382
See application file for complete search history.

(56) References Cited

U.S. PATENT DOCUMENTS

| | | | | |
|---|---|---|---|---|
| 3,782,036 A * | 1/1974 | Clark et al. | ..................... | 49/502 |
| 4,369,608 A * | 1/1983 | Miura et al. | ................. | 52/309.9 |
| 6,511,120 B1 * | 1/2003 | Mitts | ............................. | 296/202 |
| 6,827,390 B2 * | 12/2004 | Zummallen et al. | ..... | 296/146.11 |
| 7,036,874 B2 * | 5/2006 | Stojkovic et al. | ........ | 296/193.09 |
| 7,308,732 B2 * | 12/2007 | Woolcock | ....................... | 16/240 |
| 8,186,743 B2 * | 5/2012 | Anderson et al. | .......... | 296/146.6 |
| 2003/0227193 A1 * | 12/2003 | Chappuis et al. | .......... | 296/146.5 |
| 2006/0033357 A1 * | 2/2006 | Karuppaswamy et al. | | 296/146.6 |
| 2008/0295415 A1 * | 12/2008 | Mieglitz et al. | ................ | 49/502 |
| 2010/0052360 A1 * | 3/2010 | Hsu et al. | .................. | 296/146.6 |
| 2010/0225141 A1 * | 9/2010 | Mori | ......................... | 296/146.6 |

FOREIGN PATENT DOCUMENTS

| | | |
|---|---|---|
| JP | 7-37747 U | 7/1995 |
| JP | 9-228412 A | 9/1997 |
| JP | 2001-262618 A | 9/2001 |

* cited by examiner

*Primary Examiner* — Jerry Redman
(74) *Attorney, Agent, or Firm* — McDermott Will & Emery LLP

(57) ABSTRACT

A door panel that has a double-panel structure comprising an outer panel and an inner panel and is capable of ensuring sufficient strength at portions where hinges are attached is provided.

4 Claims, 12 Drawing Sheets

DOOR PANEL

CROSS REFERENCE TO PRIOR APPLICATIONS

This application is a U.S. National Phase application under 35 U.S.C. §371 of International Application No. PCT/JP2009/059684, filed on May 27, 2009 and claims benefit of priority to Japanese Patent Application No. 2008-208616, filed on Aug. 13, 2008. The International Application was published in Japanese on Feb. 18, 2010 as WO 2010/018704 A1 under PCT Article 21(2). All of these applications are herein incorporated by reference.

TECHNICAL FIELD

The present invention relates to a door panel that is provided with an outer panel and an inner panel.

BACKGROUND OF THE INVENTION

Examples of structures of a cover unit of a work machine include a double-panel structure including an outer panel and an inner panel, wherein the inner panel has a plurality of recessed portions, and the outer panel and the inner panel are affixed to each other by bonding the recessed portions of the inner panel to the outer panel and hemming the peripheral edge of the outer panel. Hinges are directly attached to a raised portion, which is the portion bulging relative to the recessed portions (e.g. See Japanese Laid-open Patent Publication No. 9-228412 (pages 2 to 3, and FIGS. 2 to 8)).

The conventional cover unit with the double-panel structure described above presents the possibility of insufficient strength, because the hinges are directly welded to a flat portion of the raised portion of the inner panel.

Furthermore, it is necessary to ensure availability of a large flat portion in order to provide the inner panel or the like with welding margins, making it difficult to add a reinforcing structure shaped with such irregularities as raised and recessed portions.

In order to solve the above problems, an object of the invention is to provide a door panel that has a double-panel structure including an outer panel and an inner panel and is capable of ensuring sufficient strength at portions where hinges are attached. Another object of the invention is to provide a door panel that enables at least apart of the periphery of the portions where the hinges are attached to be easily provided with a reinforcing structure.

SUMMARY OF THE INVENTION

The present invention relates to a door panel including an outer panel; an inner panel that is affixed to the inner surface of the outer panel and provided, at least at one lateral end thereof, with a reinforcing plate housing raised portion bulging in the direction away from the outer panel; and an internal reinforcing plate affixed between the outer panel and the reinforcing plate housing raised portion provided at the aforementioned lateral end of the inner panel. The inner panel includes a plurality of flat hinge mounting surface portions formed on the reinforcing plate housing raised portion at the aforementioned lateral end of the inner panel. The inner panel also includes reinforcing groove portions, each of which is formed along at least a part of the periphery of each respective hinge mounting surface portion and protrudes from the inner surface of the inner panel. The internal reinforcing plate includes hinge mounting raised portions, each of which has a flat surface adapted to be in close contact with each respective hinge mounting surface portion of the inner panel. The internal reinforcing plate also includes reinforcing recessed portions, each of which extends along at least a part of the periphery of each respective hinge mounting raised portion and is adapted to fit to each respective reinforcing groove portion of the inner panel. The door panel also includes hinges, each of which is attached to each respective hinge mounting surface portion of the inner panel and each respective hinge mounting raised portion of the internal reinforcing plate.

According to the present invention, the hinge mounting surface portions of the inner panel and the hinge mounting raised portions of the internal reinforcing plate of the door panel are provided with bolt insertion holes; and the door panel further includes nuts that are conjoined with the respective peripheries of the bolt insertion holes of the reverse surface of the hinge mounting raised portions of the internal reinforcing plate; and bolts adapted to be respectively screwed in the nuts through the bolt insertion holes of the inner panel and the bolt insertion holes of the internal reinforcing plate, thereby fixing the hinges that are in contact with the hinge mounting surface portions of the inner panel.

According to the present invention, the hinge mounting surface portions of the inner panel and the hinge mounting raised portions of the internal reinforcing plate of the door panel of the present invention are respectively provided with positioning fitting portions having a protruding or indented shape so as to be capable of fitting to each other.

In the door panel including the outer panel and the inner panel according to the present invention, the hinge mounting surface portions of the inner panel are structurally reinforced by the reinforcing groove portions, each of which is formed along at least a part of the periphery of each respective hinge mounting surface portion; the hinge mounting raised portions of the internal reinforcing plate affixed between the outer panel and the reinforcing plate housing raised portion provided at one lateral end of the inner panel are structurally reinforced by the reinforcing recessed portions, each of which is formed along at least a part of the periphery of each respective hinge mounting raised portion; and the reinforcing groove portions of the inner panel and the reinforcing recessed portions of the internal reinforcing plate respectively fit to each other and thereby further strengthen the structure. Therefore, it is capable of structurally reinforcing the hinge mounting surface portions and the hinge mounting raised portions, all of which bear the weight of the door panel itself. As a result, sufficient strength is ensured at the portions where the hinges are attached.

According to the present invention, the hinges are mounted on the inner panel by conjoining the nuts with the respective peripheries of the bolt insertion holes of the reverse surface of the hinge mounting raised portions of the internal reinforcing plate; bringing the hinges into contact with the hinge mounting surface portions of the inner panel; and tightening the bolts screwed in the nuts respectively through the bolt insertion holes of the inner panel and the bolt insertion holes of the internal reinforcing plate, thereby fixing the hinges. Therefore, the structure described above enables unsightly welding marks to be place out of the line of sight. As the hinges are fastened by using the bolt tightening structure instead of welding, the necessity for flat welding margins, which are required should welding be used, is eliminated. Therefore, as the portions that must be formed as flat surfaces can be limited to the hinge mounting surface portions of the inner panel and the hinge mounting raised portions of the internal reinforcing plate, each hinge mounting portion can easily be provided along at least a part of the periphery thereof with a reinforcing structure comprised of each respective reinforcing groove portion of the inner panel or reinforcing recessed portion of the internal reinforcing plate.

According to the present invention, the hinge mounting surface portions of the inner panel are formed as flat surfaces, and the hinge mounting raised portions of the internal reinforcing plate, too, have flat surfaces. Therefore, the positioning fitting portions, which are provided in these flat surfaces, can be formed easily with high precision in such a shape as to fit in a male-female engagement, without being subjected to limitations concerning the layout of the components, such as the locations at which the hinges are mounted or the shape of the door panel.

BRIEF DESCRIPTION OF DRAWINGS

FIGS. 8(a)-8(d) show sectional views illustrating a production process of the door panel along the line VIII-VIII of FIG. 10, wherein FIG. 8(a) shows the state where the internal reinforcing plate is positioned in an inner panel by means of a bolt for temporary fastening; FIG. 8(b) shows the state where the inner panel and the internal reinforcing plate are affixed to an outer panel; FIG. 8(c) shows the state where the bolt for temporary fastening is removed; and FIG. 8(d) shows the state where a hinge is fastened by tightening a bolt.

DETAILED DESCRIPTION OF THE INVENTION

Figure 9:
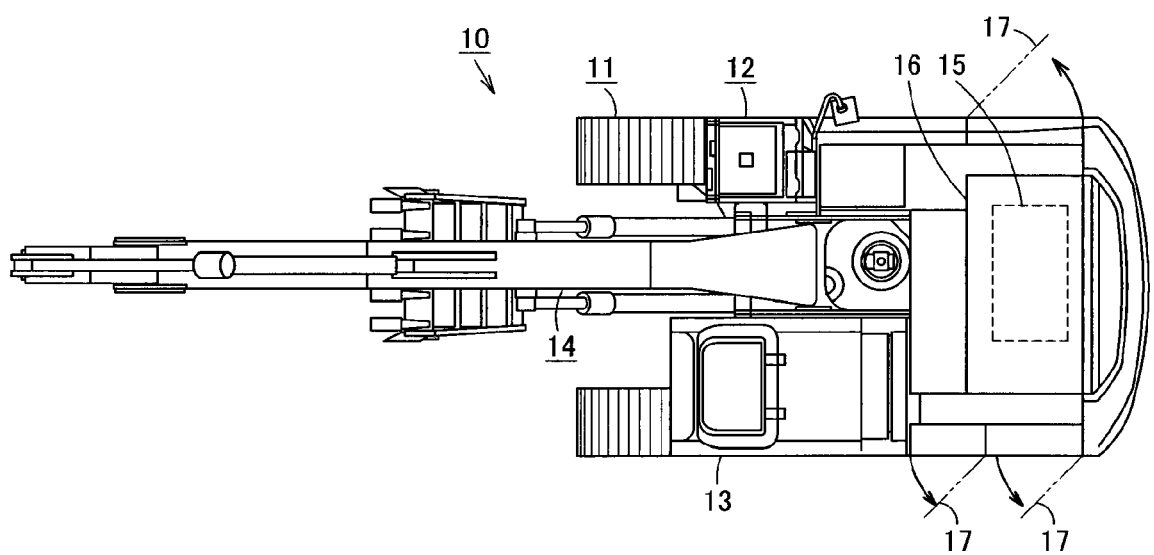
FIG. 9 is a plan view of a work machine provided with the door panel.
Figure 10:
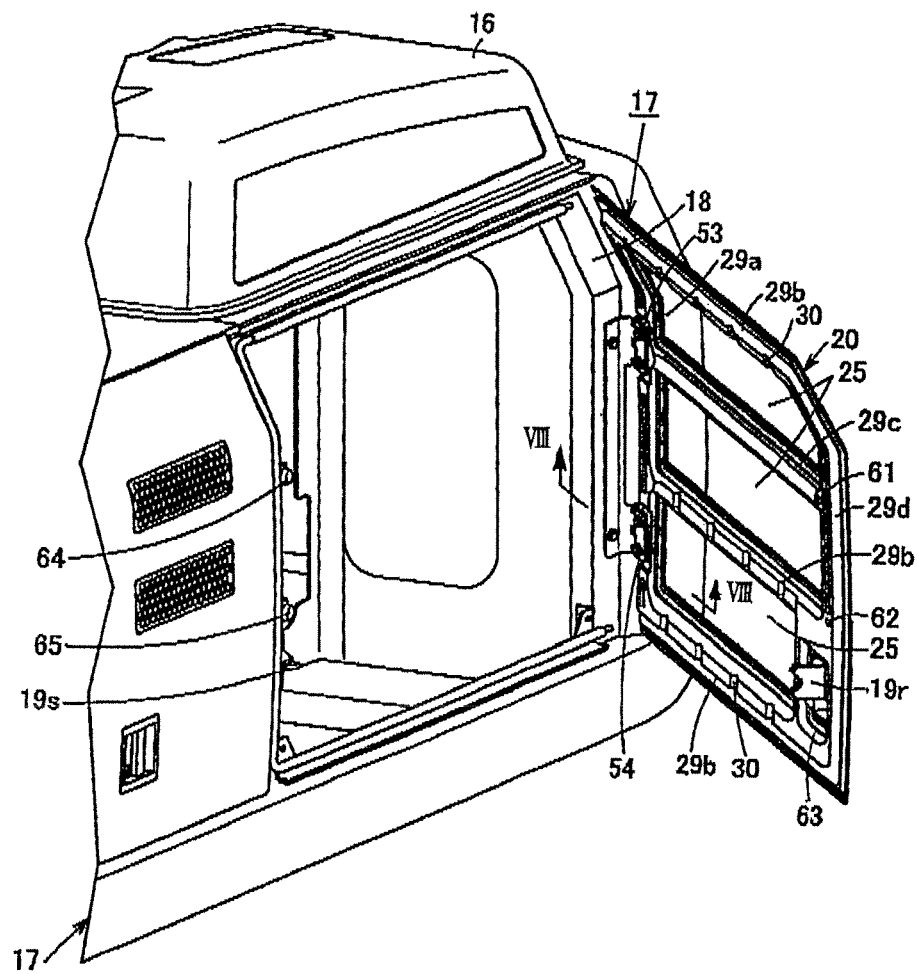
FIG. 10 is a perspective view showing how the door panel is attached to the work machine.
Figure 11:
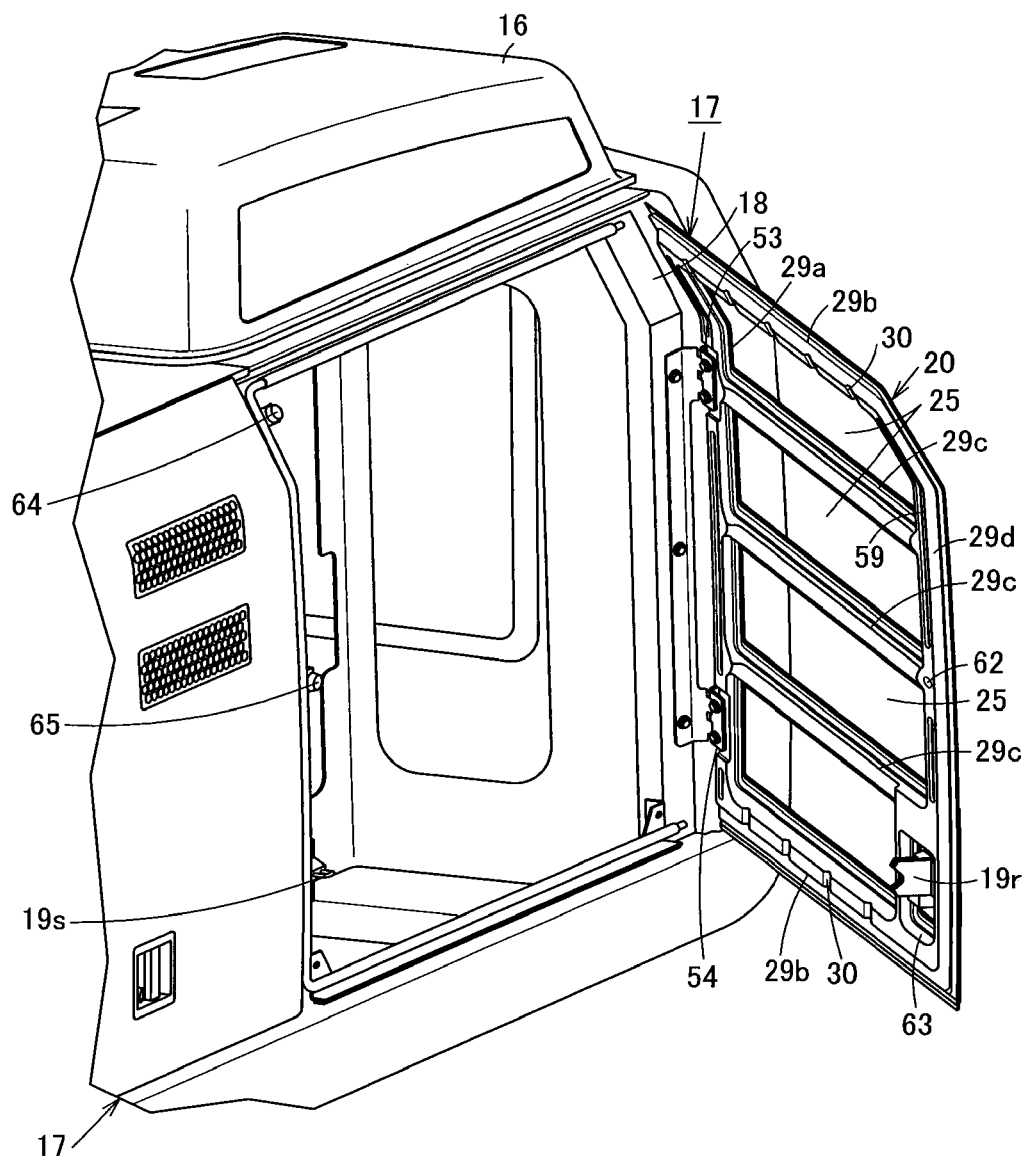
FIG. 11 is a perspective view of a door panel according to another embodiment of the present invention in the state where the door panel is attached to the work machine.
Figure 12:
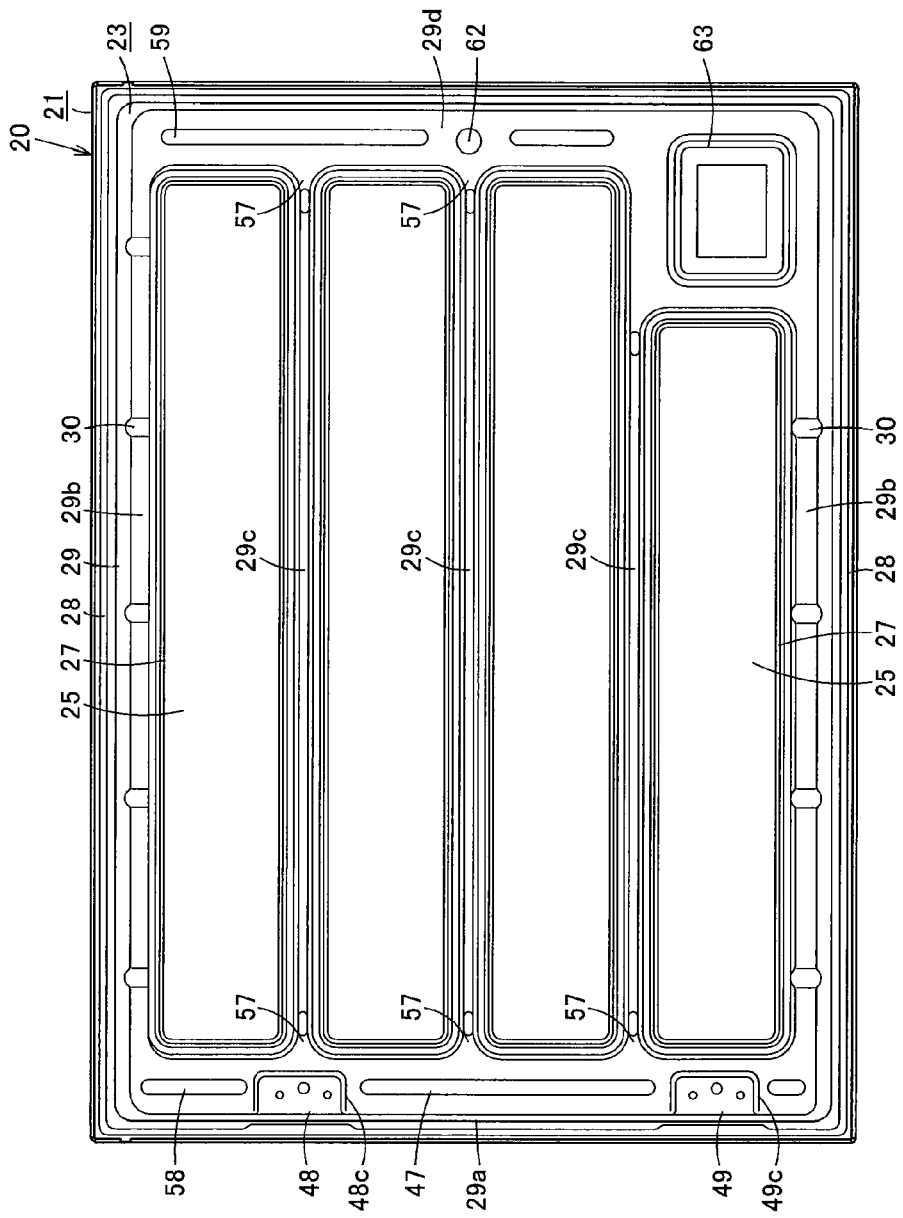
FIG. 12 is a front view of the door panel illustrated in another embodiment of FIG. 11 wherein the door panel is seen from the inner side.

Next, the present invention is explained in detail hereunder, referring to an example thereof illustrated in FIGS. 1 to 10, and another example thereof illustrated in FIGS. 11 and 12.

FIG. 9 illustrates a hydraulic excavator 10, which is a work machine. The hydraulic excavator 10 includes a lower structure 11, an upper structure 12, a cab 13, a work equipment 14, and a power system 15 that includes an engine. The cab 13, the work equipment 14, and the power system 15 are mounted on the upper structure 12, which is rotatably mounted on the lower structure 11. The power system 15 is covered by a top cover 16, side doors 17, and other such components.

FIG. 10 illustrates a side door 17 provided at the radiator room. The side door 17 is attached to a frame provided at the machine body. The side door 17 is attached to a hinge-attaching end 18, i.e. one of the lateral ends of the frame, by hinges 53, 54, which will be explained later, so as to be capable of opening and closing. A striker 19s is attached to the opposite lateral end of the frame. The side door 17 is also provided with a latching device 19r, which can be engaged with and disengaged from the striker 19s, so that the side door 17 is maintained in the closed state by means of the latching device 19r.

FIGS. 1 to 6 illustrate a door panel 20 of the side door 17. The door panel 20 includes an outer panel 21, an inner panel 23, and a foamed material 24. The inner panel 23 is formed by means of press molding so as to have an uneven surface with recessed portions and raised portions. The recessed portions are fixed to the inner surface of the outer panel 21, and a space 22 is formed between the raised portions and the outer panel 21 and filled with the aforementioned foamed material 24. Three ventilation openings 25 arranged one above another are formed in each panel, i.e. the outer panel 21 and the inner panel 23.

The outer panel 21 has a thickness ranging from 1.2 to 5.0 times that of the inner panel 23. In other words, an iron plate that is thinner than the outer panel 21 is used to form the inner panel 23. For example, if the outer panel 21 is an iron plate with a thickness of 1.2 mm, it is desirable to use a thin iron plate with a thickness of, for example, 0.6 or 0.8 mm to form the inner panel 23 in order to obtain sufficient strength and workability, which are reciprocal properties.

The foamed material 24 is formed by heating an unactivated foaming sheet of a foaming material, which is attached to the inner surface of the outer panel 21 or inner surface of the inner panel 23, so that the heated foaming material is activated and expands inside the space 22 between the outer panel 21 and the inner panel 23. A highly expandable foaming rubber-base sound absorbing material that has an approximately 20-fold volumetric thermal expansion coefficient may desirably be used as the foaming material. It is desirable to conduct the heating of the foaming material during the baking finish process using a baking finish heating furnace.

Figure 1:
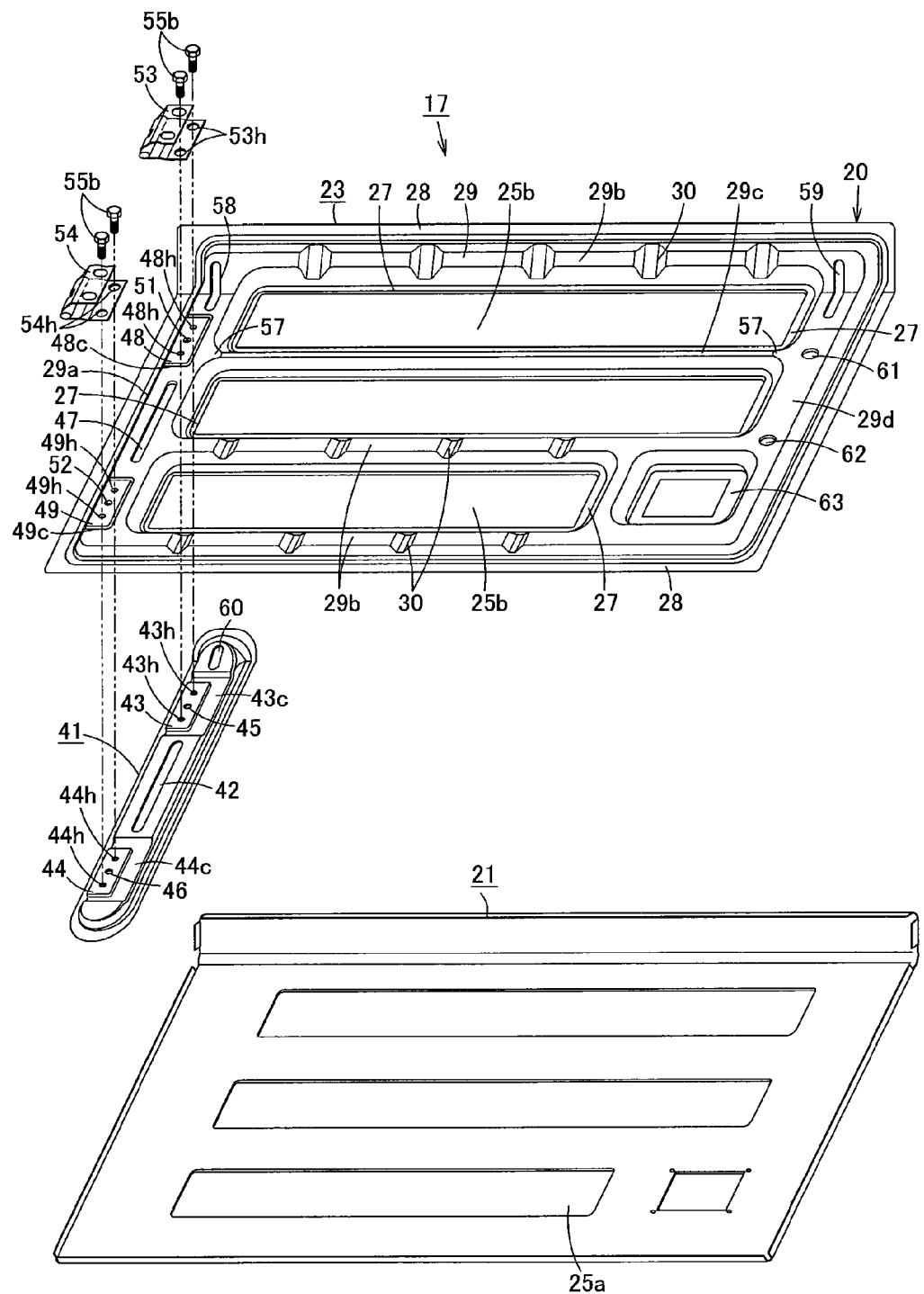
FIG. 1 is an exploded perspective view of a door panel according to an embodiment of the present invention.
Figure 2:
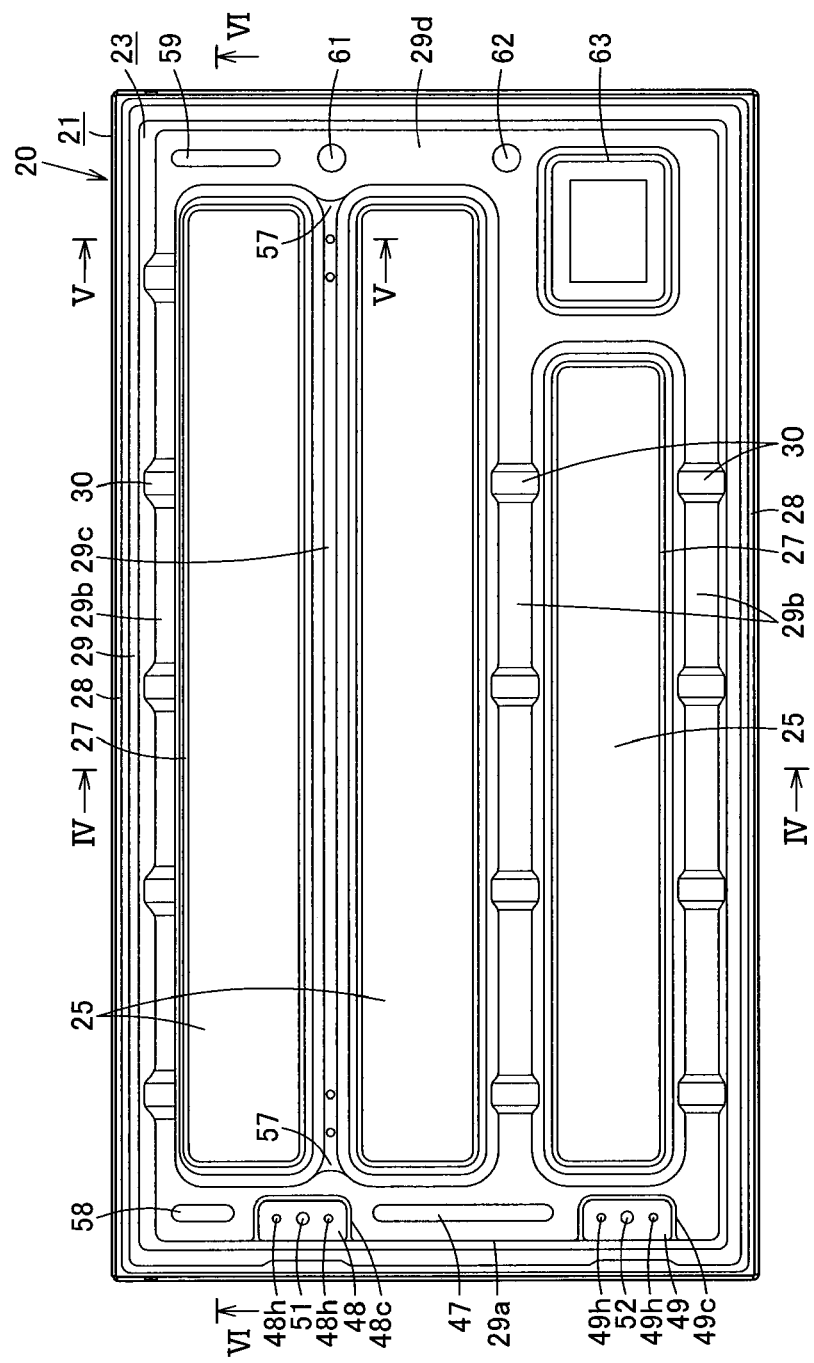
FIG. 2 is a front view of the inner face of the door panel.

As illustrated in FIGS. 1 and 2, the inner panel 23 has adhering portions 27, 28, which are the aforementioned recessed portions joined to the inner surface of the outer panel 21, and a raised portion 29 bulging from the adhering portions 27, 28. The adhering portions 27 surround the ventilation openings 25. The adhering portion 28 extends along the peripheral edge of the inner panel 23.

The raised portion 29 of the inner panel 23 comprises a reinforcing plate housing raised portion 29a, laterally extending reinforcing raised portions 29b, 29c, and a reinforcing raised portion 29d. The reinforcing plate housing raised portion 29a is formed at the hinge-attaching end of the inner panel 23. The reinforcing raised portions 29b are located at the top, the third from the top, and the bottom and have a thick crossbar-like shape. The reinforcing raised portion 29c, which also extends laterally, is located at the second from the top and has a smaller cross section. The reinforcing raised portion 29d is formed at the latch-attaching end of the inner panel 23.

Each reinforcing raised portion 29b, which is formed in a thick crossbar-like shape, is provided with reinforcing indentations 30 that are formed vertically across the reinforcing raised portion 29b. In order to ensure a sufficient aperture area for the ventilation openings 25, as illustrated in FIG. 4, the reinforcing raised portion 29c with a smaller cross section is formed narrower as well as the height from an outer panel 21 to the reinforcing raised portion 29c is lower than the height from the outer panel 21 to the reinforcing raised portion 29b.

Figure 4:
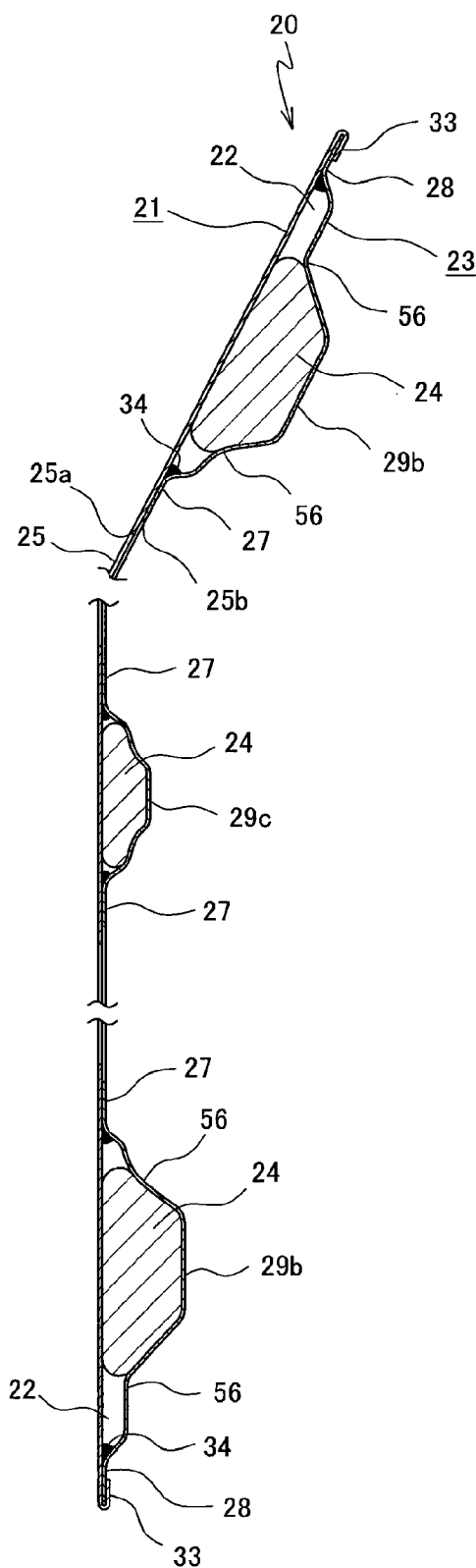
FIG. 4 is a sectional view of the door panel taken along the line IV-IV of FIG. 2.
Figure 5:
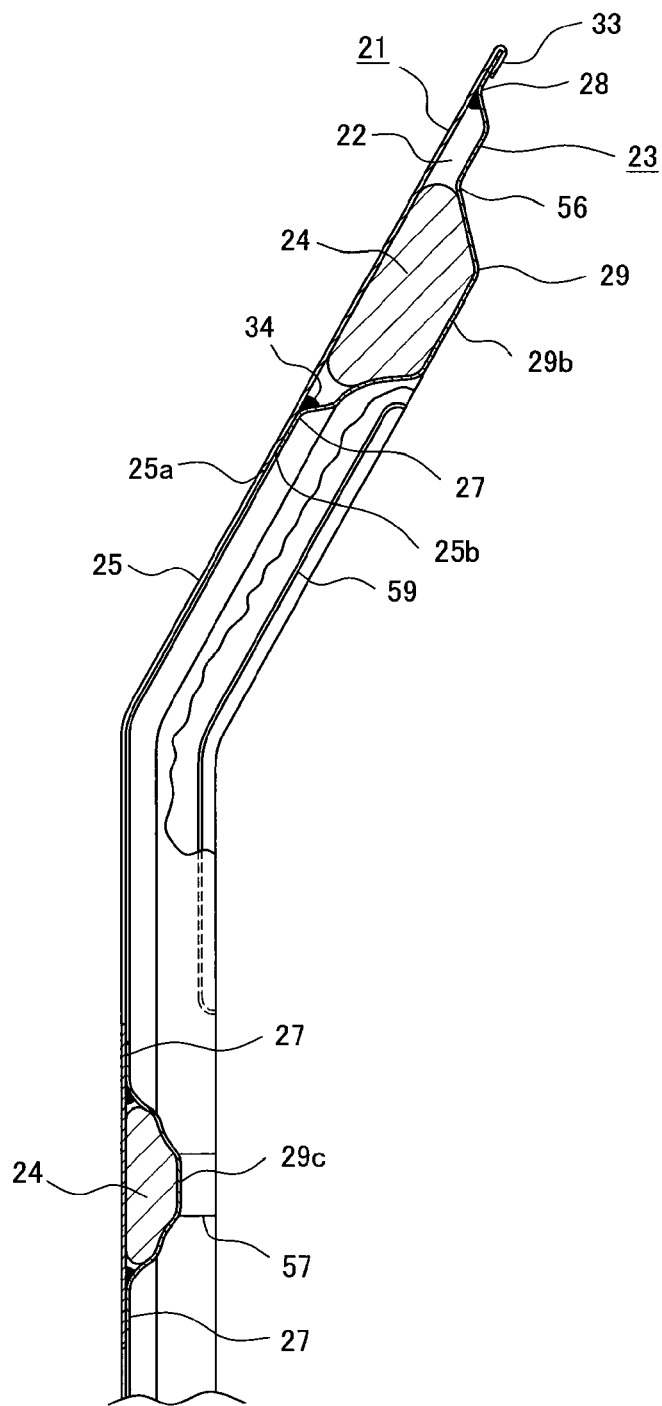
FIG. 5 is a sectional view of the door panel taken along the line V-V of FIG. 2.
Figure 6:
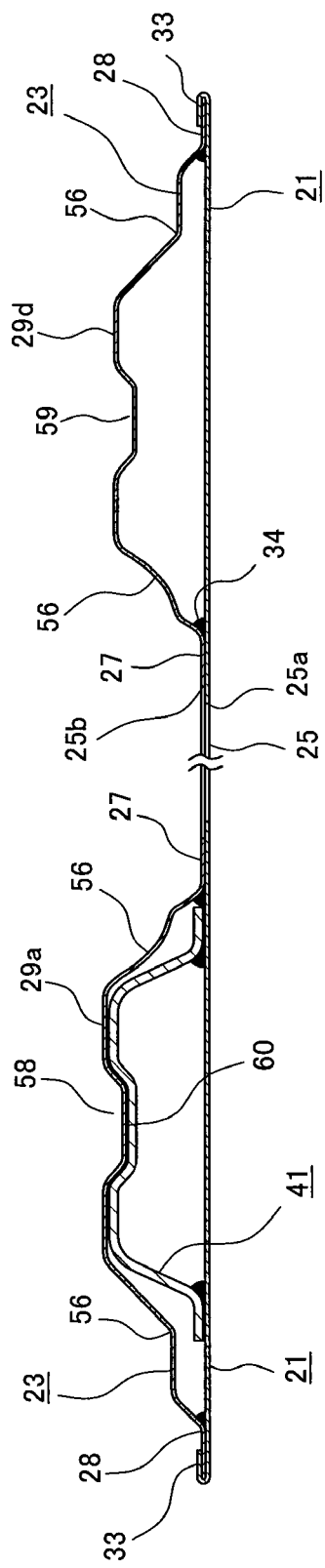
FIG. 6 is a sectional view of the door panel taken along the line VI-VI of FIG. 2.

As illustrated in FIGS. 4 to 6, the adhering portions 27 of the inner panel 23 are provided with ventilation openings 25b, which are provided at locations respectively corresponding to the three ventilation openings 25a formed in the outer panel 21. Each ventilation opening 25b is slightly larger than the corresponding ventilation opening 25a of the outer panel 21.

The outer peripheral edge of the outer panel 21 is provided with a hemmed portion 33 that is formed by folding the outer peripheral edge of the outer panel 21 so as to curl over the peripheral edge of the inner panel 23 and then pressing down the folded part substantially flat so that the outer peripheral edge of the outer panel 21 interlockingly secures the peripheral edge of the inner panel 23. The adhering portions 27, 28 of the inner panel 23 are bonded to the outer panel 21 with an adhesive 34, which joins as well as seals the outer panel 21 and the adhering portions 27, 28 of the inner panel 23 together. The adhesive 34 may desirably be a paste-type structural adhesive having both viscous and thermosetting properties.

Figure 7:
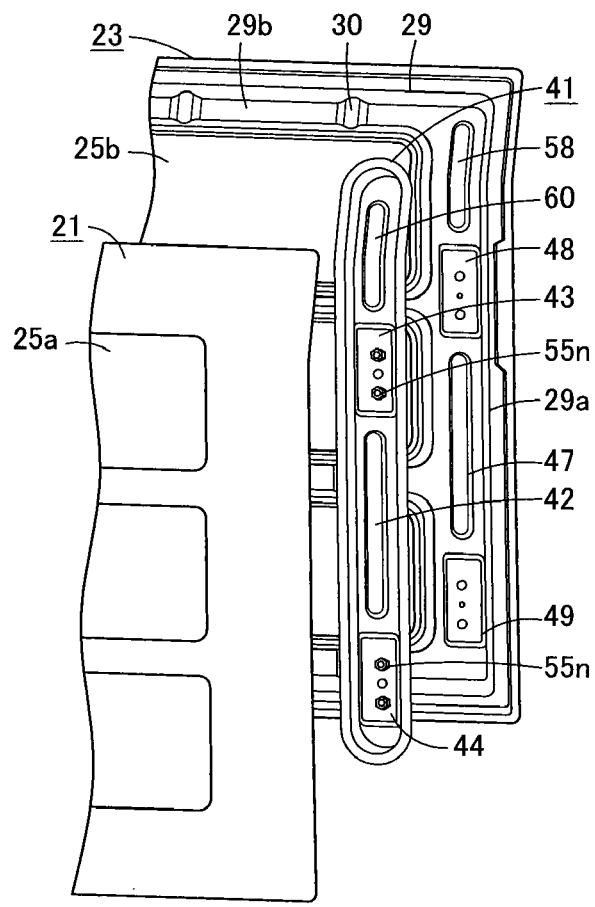
FIG. 7 is an exploded perspective of the door panel, as viewed from the outer face of the door panel.
Figure 8:
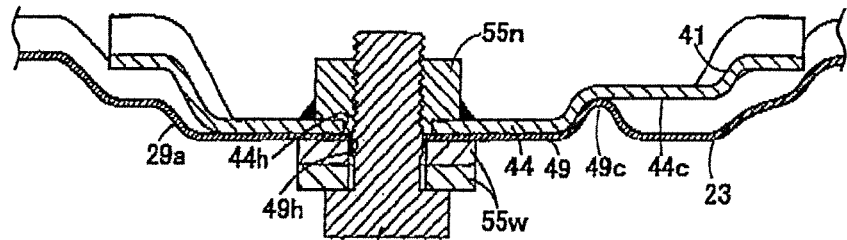
Figure 8:
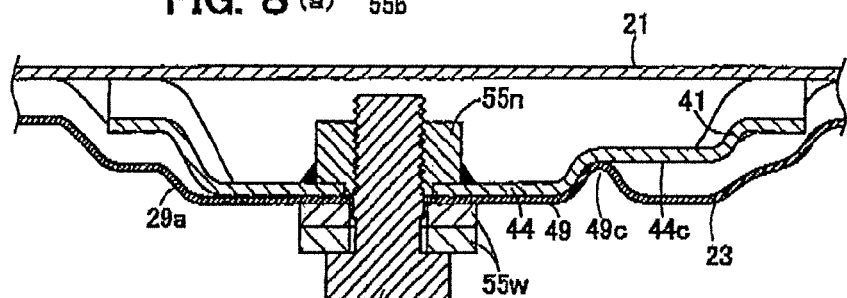
Figure 8:
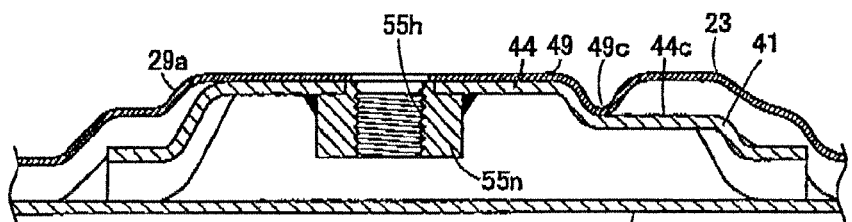
Figure 8:
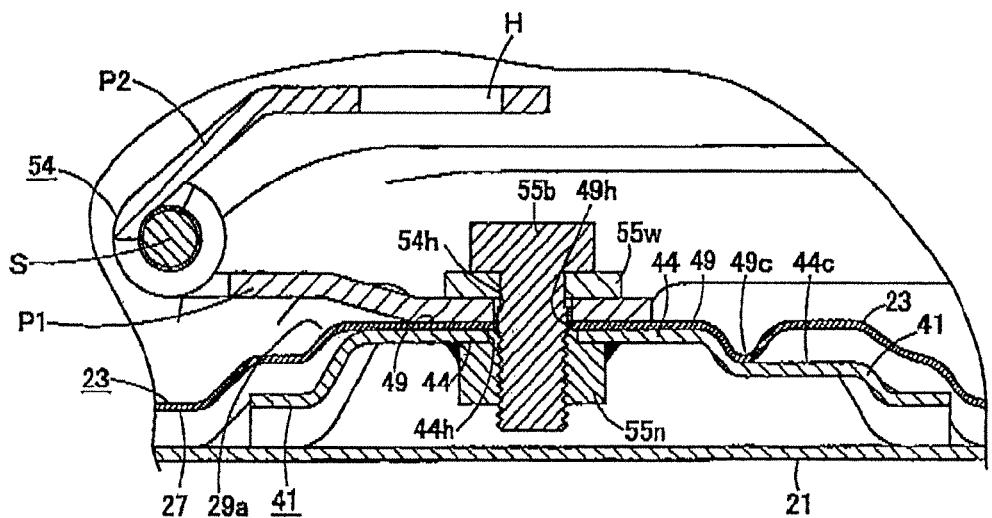

FIGS. 1 and 7 are exploded perspective views of the side door 17, illustrating how an internal reinforcing plate 41 for mounting hinges is affixed. To be more specific, the internal reinforcing plate 41 is sandwiched between the outer panel 21 and the inner panel 23 in the state where the inner panel 23 is positioned on and affixed to the inner surface of the outer panel 21.

Figure 3:
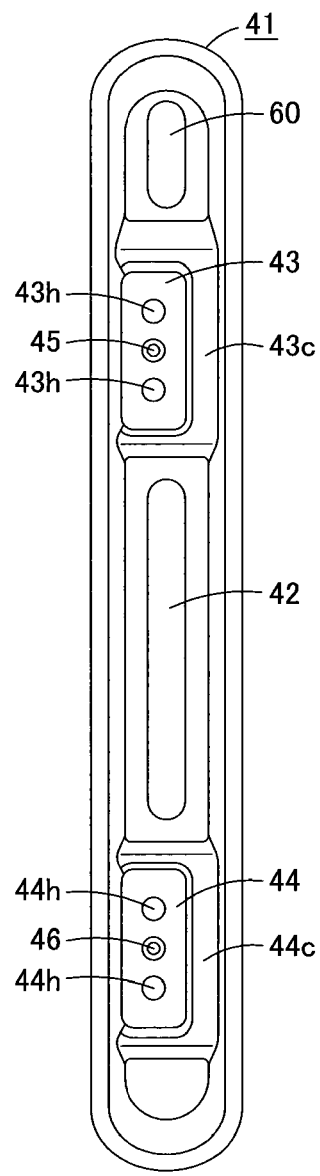
FIG. 3 is a front view of an internal reinforcing plate of the door panel.

As illustrated in FIG. 3, the internal reinforcing plate 41 is provided at the middle portion thereof with a long, narrowly-shaped grooved reinforcing portion 42. Hinge mounting raised portions 43, 44 with a flat top surface are respectively formed at one end and the opposing end of the grooved reinforcing portion 42. Two bolt insertion holes 43h or 44h are formed in each hinge mounting raised portion 43 or 44. Each hinge mounting raised portion 43 or 44 is surrounded on three sides by a reinforcing recessed portion 43c or 44c. Furthermore, each hinge mounting raised portion 43 or 44 is provided, at a middle portion thereof, with a positioning fitting portion 45 or 46 in the shape of an indentation. The positioning fitting portion 45 is formed between the two bolt insertion holes 43h, 43h, whereas the positioning fitting portion 46 is formed between the two bolt insertion holes 44h, 44h.

As illustrated in FIGS. 1 and 2, at the location corresponding to the internal reinforcing plate 41, the inner panel 23 is provided with a long, narrowly-shaped grooved reinforcing portion 47, which is formed at the middle part of the reinforcing plate housing raised portion 29a located at the hinge-attaching end of the inner panel 23. The grooved reinforcing portion 47 protrudes from the reverse surface, in other words the inner surface, of the inner panel 23 so as to be fitted in the grooved reinforcing portion 42 of the internal reinforcing plate 41. Flat hinge mounting surface portions 48, 49 are respectively formed at one end and the opposing end of the grooved reinforcing portion 47. Two bolt insertion holes 48h or 49h are formed in each hinge mounting surface portion 48 or 49. Each hinge mounting surface portion 48 or 49 is surrounded on three sides by a reinforcing groove portion 48c or 49c, which protrudes from the reverse surface of the inner panel 23 towards the internal reinforcing plate 41. Furthermore, each hinge mounting surface portion 48 or 49 is provided, at a middle portion thereof, with a positioning fitting portion 51 or 52 in the shape of a protrusion protruding downward as viewed in FIG. 1. The positioning fitting portion 51 is formed between the two bolt insertion holes 48h, 48h, whereas the positioning fitting portion 52 is formed between the two bolt insertion holes 49h, 49h.

By fitting the positioning fitting portions 51, 52 formed on the hinge mounting surface portions 48, 49 of the inner panel 23 respectively in the positioning fitting portions 45, 46 formed in the hinge mounting raised portions 43, 44 of the internal reinforcing plate 41, the internal reinforcing plate 41 is immovably positioned with respect to the inner panel 23. By thus positioning the internal reinforcing plate 41, the grooved reinforcing portion 47 of the inner panel 23 is fitted in the grooved reinforcing portion 42 of the internal reinforcing plate 41, and the bolt insertion holes 43h, 44h of the internal reinforcing plate 41 and the bolt insertion holes 48h, 49h of the inner panel 23 are precisely aligned with each other.

As illustrated in FIG. 1, hinges 53, 54, each of which has two bolt insertion holes 53h or 54h, are respectively brought into contact with the hinge mounting surface portions 48, 49 of the inner panel 23. As illustrated in FIG. 8(d), each hinge 53 or 54 has a plate P1 and another plate P2. The plate P1 is adapted to be fixed onto the hinge mounting surface portion 48 or 49 of the inner panel 23, and the plate P2 is pivotally connected to the plate P1 through a shaft member S. Elongated holes H for receiving bolts therein for attaching the side door 17 to the hinge-attaching end 18 of the frame provided at the machine body are formed in each plate P2.

Nuts 55n are welded to the reverse surface of each hinge mounting raised portion 43 or 44 of the internal reinforcing plate 41 beforehand. Each nut 55n is positioned concentrically with each respective bolt insertion hole 43h or 44h. As illustrated in FIG. 8(d), bolts 55b that are inserted in the bolt insertion holes 53h, 54h of the hinges 53, 54 are respectively screwed into the nuts 55n, thereby fastening the hinges 53, 54.

As illustrated in FIG. 4, the inner panel 23 includes the raised portion 29 formed along so as to bulge from the adhering portions 27, 28, which are indirect contact with the outer panel 21. A reinforcing deformed portion 56 is formed in a step-like shape along the middle of each sloping side of the raised portion 29, enabling the raised portion 29 to have a sufficient height with respect to the outer panel 21 as well as sufficient strength. Because of the reinforcing deformed portions 56 and the reinforcing indentations 30, the thick, cross-bar-shaped reinforcing raised portions 29b are excellent in cross-sectional characteristics, such as the geometric moment of inertia, and are particularly resistant to bending stress and not easily deformed.

On the other hand, as illustrated in FIG. 5, the reinforcing raised portion 29c with a smaller cross section is formed narrower than each reinforcing raised portion 29b, thereby enabling the ventilation openings 25 to have a large aperture area. The reinforcing raised portion 29c can easily be formed by drawing, because it is designed to be lower than bulging portions 57 at which the reinforcing raised portion 29c is connected to the reinforcing raised portion 29a at the hinge-attaching end and the reinforcing raised portion 29d at the latch-attaching end.

As illustrated in FIG. 10, the upper part of the door panel 20 is bent towards the machine body more than is the lower part of the door panel 20, which extends almost vertically. When the upper part of the door panel 20 is bent, wrinkles are prone to forming on the upper part of the reinforcing plate housing raised portion 29a and the reinforcing raised portion 29d, which are respectively located at the hinge-attaching end and the latch-attaching end of the inner panel 23. Therefore, as illustrated in relevant drawings including FIGS. 1, 2, 5, and 6, in order to prevent formation of wrinkles, wrinkle preventing indentations 58, 59 are respectively formed in the reinforcing plate housing raised portion 29a at the hinge-attaching end and the reinforcing raised portion 29d at the latch-attaching end of the inner panel 23, at locations where the reinforcing plate housing raised portion 29a and the reinforcing raised portion 29d are bent.

As illustrated in FIGS. 1, 3, and 6, the internal reinforcing plate 41, too, is provided with an indentation 60, in which one of the wrinkle preventing indentations of the inner panel 23, i.e. the wrinkle preventing indentation 58, is adapted to be fitted in order to prevent interference with the wrinkle preventing indentation 58.

As illustrated in FIGS. 1, and 2, vibration suppressing indentations 61, 62 and a latch mounting hole 63 are formed in the reinforcing raised portion 29d, at respective locations below the other wrinkle preventing indentation of the inner panel 23, i.e. the wrinkle preventing indentation 59. The vibration suppressing indentations 61, 62 are utilized to suppress vibration of the door panel 20. FIG. 10 illustrates an example wherein the frame provided at the machine body includes vibration suppressing protrusions 64, 65, which are formed at the end where the striker 19s for engaging with the latching device 19r is provided. The vibration suppressing protrusions 64, 65 are adapted to fit in the vibration suppressing indentations 61, 62 so as to prevent vertical vibration of the door panel 20, when the door panel 20 is in the closed state.

Next, a production process of the door panel 20 is explained.

The formed inner panel 23 is oriented with the reverse surface, in other words the inner surface, facing upward as viewed in FIG. 8(a), and the internal reinforcing plate 41, which is also oriented with the reverse surface facing upward, is positioned in the reinforcing plate housing raised portion 29a of the inner panel 23. At that time, the positioning fitting portions 51, 52 formed on the hinge mounting surface portions 48, 49 of the inner panel 23 are respectively fitted in the positioning fitting portions 45, 46 formed in the hinge mounting raised portions 43, 44 of the internal reinforcing plate 41 so that the internal reinforcing plate 41 is immovably positioned with respect to the inner panel 23. When the internal reinforcing plate 41 is in the immovably positioned state, the internal reinforcing plate 41 can be temporarily fixed to the inner panel 23 by screwing, through washers 55w, the bolts 55b that are inserted in the bolt insertion holes 48h, 49h of the hinge mounting surface portions 48, 49 of the inner panel 23 in the nuts 55n that are conjoined with a reverse surface which is in the other side with the inner panel 23 of the hinge mounting raised portions 43, 44 of the internal reinforcing plate 41.

As illustrated in FIG. 8(b), in the state where the inner panel 23, the internal reinforcing plate 41, and the outer panel 21 are fastened to one another by the hemmed portion 33 (FIG. 6), which is provided along the peripheral edge of the outer panel 21, and a fixing jig (not shown), the inner panel 23, the internal reinforcing plate 41, and the outer panel 21 are placed in a baking finish heating furnace (not shown) in order to bond the inner panel 23, the internal reinforcing plate 41, and the outer panel 21 to one another by hardening the thermosetting adhesive 34 applied to the surfaces between the outer panel 21 and the inner panel 23 and between the outer panel 21 and the internal reinforcing plate 41 as illustrated in FIG. 6.

At that time, the foaming material attached to the inner surface of the outer panel 21 or the inner surface of the inner panel 23 is expanded by heating using the baking finish heating furnace so that the space 22 is filled with the foamed material 24. By further heating using the baking finish heating furnace, the paint that has been sprayed beforehand onto the outer surface of the outer and inner panels 21, 23 is baked thereon.

For example, thermal hardening of the adhesive 34 is conducted by heating for 5 minutes at 150° C.; formation of the foamed material 24 by expansion by heating for 20 minutes at 150° C.; and baking finish by heating for 20 minutes at 180° C.~200° C. Such heating can be performed by using a conventional baking finish heating furnace.

After the heating, the bolts 55b for temporary fixing are removed as illustrated in FIG. 8(c), and, as illustrated in FIG. 8(d), the bolts 55b inserted into the bolt insertion holes 53h, 54h of the hinges 53, 54 and the bolt insertion holes 48h, 49h of the hinge mounting surface portions 48, 49 of the inner panel 23 are screwed into the nuts 55n, which are conjoined with the reverse surface of the hinge mounting raised portions 43, 44 of the internal reinforcing plate 41. Thus, the hinges 53, 54 are fastened by tightening these nuts 55n and bolts 55b.

Next, FIGS. 11 and 12 illustrate another example of the present invention. The door panel according to this example has a greater total height than that of the example described above. Four ventilation openings 25 are arranged one above another are formed in each one of the outer panel 21 and the inner panel 23. Furthermore, only the top and bottom reinforcing raised portions comprise reinforcing raised portions 29b, which have a thick crossbar-like shape and are provided with reinforcing indentations 30. The second, third, and fourth crossbar-shaped portions comprise reinforcing raised portions 29c with a smaller cross section.

Next, the functions and effects of the examples illustrated in FIGS. 1 to 12 are explained hereunder.

The hollow structure with a closed cross section formed of the outer panel 21 and the inner panel 23, which is thinner than the outer panel 21, can make the entire door panel 20 lighter. Furthermore, as the closed cross section of this hollow structure has sufficient height, being formed of the inner panel 23 and the outer panel 21 with a thickness greater than that of the inner panel 23, i.e. 1.2 to 5.0 times thicker than the inner panel 23, the door panel has sufficient strength against an external impact. Therefore, the examples are capable of inexpensively providing a door panel that is light in weight and has sufficient strength.

Furthermore, the foamed material 24 filling the space between the outer panel 21 and the inner panel 23 is capable of absorbing sound and thereby effectively damping sound generated from the door panel itself and, consequently, provides high damping effect to reduce noise.

In the double-panel structure of the outer panel 21 and the inner panel 23, the hinge mounting surface portions 48, 49 of the inner panel 23 are structurally reinforced by the reinforcing groove portions 48c, 49c, each of which surrounds three sides of each respective hinge mounting surface portion 48 or 49; the hinge mounting raised portions 43, 44 of the internal reinforcing plate 41 affixed between the outer panel 21 and the reinforcing plate housing raised portion 29a, which is provided at a lateral end, i.e. the hinge attaching end, of the inner panel 23, are structurally reinforced by the reinforcing recessed portions 43c, 43c, each of which surrounds three sides of each respective hinge mounting raised portion 43 or 44; and the reinforcing groove portions 48c, 49c of the inner panel 23 and the reinforcing recessed portions 43c, 43c of the internal reinforcing plate 41 respectively fit to each other and thereby further strengthen the structure. Therefore, it is capable of structurally reinforcing the hinge mounting surface portions 48, 49 and the hinge mounting raised portions 43, 44, all of which bear the weight of the door panel 20 itself. As a result, sufficient strength is ensured at the portions where the hinges are attached.

The hinges 53, 54 are mounted on the inner panel 23 by conjoining the nuts 55n with the respective peripheries of the bolt insertion holes 53h, 54h of the reverse surface of the hinge mounting raised portions 43, 44 of the internal reinforcing plate 41; bringing the hinges 53, 54 into contact with the hinge mounting surface portions 48, 49 of the inner panel 23; and tightening the bolts 55b screwed in the nuts 55n respectively through the bolt insertion holes of the inner panel 23 and the internal reinforcing plate 41, thereby fixing the hinges 53, 54. Therefore, the structure described above is capable of preventing visible welding marks, which are unattractive in appearance. As the hinges 53, 54 are fastened by using the bolt tightening structure instead of welding, the necessity for flat welding margins, which are required should welding be used, is eliminated. Therefore, as the portions that must be formed as flat surfaces can be limited to the hinge mounting surface portions 48, 49 of the inner panel 23 and the hinge mounting raised portions 43, 44 of the internal reinforcing plate 41, each hinge mounting portion can easily be provided at three sides thereof with a reinforcing structure comprised of each respective reinforcing groove portion 48c or 49c of the inner panel 23 or reinforcing recessed portion 43c or 43c of the internal reinforcing plate 41.

As the hinge mounting surface portions 48, 49 of the inner panel 23 and the top surfaces of the hinge mounting raised portions 43, 44 of the internal reinforcing plate 41 are formed as flat surfaces, the positioning fitting portions 51, 52 and the positioning fitting portions 45, 46, which are provided in these flat surfaces, can be formed easily with high precision in such a shape as to fit in a male-female engagement, without being subjected to limitations concerning the layout of the components, such as the locations at which the hinges are mounted or the shape of the door panel.

The wrinkle preventing indentations 58, 59 are respectively formed in the reinforcing plate housing raised portion 29a at the hinge-attaching end and the reinforcing raised portion 29d at the latch-attaching end of the inner panel 23, at locations where the reinforcing plate housing raised portion 29a and the reinforcing raised portion 29d are bent. Therefore, by absorbing the force that forms wrinkles, these wrinkle preventing indentations 58, 59 improve formability of the bent portion when bending the upper part of the reinforcing plate housing raised portion 29a and the reinforcing raised portion 29d, thereby ensuring formation of a wrinkle free, unblemished surface, as well as reducing the incidence rate of defective products.

Each hinge mounting raised portion 43 or 44 is surrounded on three sides by a reinforcing recessed portion 43c or 44c, and each hinge mounting surface portion 48 or 49 is surrounded on three sides by a reinforcing groove portion 48c or 49c according to the embodiments described above. However, should there be sufficient area, each reinforcing recessed portion or reinforcing groove portion may surround the four sides of each respective hinge mounting raised portion or hinge mounting surface portion. On the other hand, should the area be insufficient, each reinforcing recessed portion may be formed in an L-like shape, in other words along two continuous sides of each respective hinge mounting raised portion 43 or 44 or hinge mounting surface portion 48 or 49.

The present invention provides a door panel that is applicable to a side door or the like of a radiator room, a battery room, a pump room, or the like of a work machine, such as a hydraulic excavator, a loader, or a bulldozer.

The invention claimed is:
1. A door panel comprising:
   an outer panel;
   an inner panel that is affixed to an inner surface of the outer panel and provided, at least at one lateral end thereof, with a reinforcing plate housing raised portion bulging in a direction perpendicular to the outer panel; and
   an internal reinforcing plate affixed between the outer panel and the reinforcing plate housing raised portion provided at said lateral end of the inner panel, and affixed to the outer panel, wherein:
   the inner panel includes:
      a plurality of flat hinge mounting surface portions formed on the reinforcing plate housing raised portion at said lateral end of the inner panel; and
      reinforcing groove portions, each of which is formed along at least a part of the periphery of each respective hinge mounting surface portion and protrudes from an inner surface closest to an inside of the door of the inner panel,
   the internal reinforcing plate includes:
      hinge mounting raised portions, each of which has a flat surface adapted to be in close contact with each respective hinge mounting surface portion of the inner panel; and
      reinforcing recessed portions, each of which extends along at least a part of the periphery of each respective hinge mounting raised portion and is adapted to fit to each respective reinforcing groove portion of the inner panel, and
   the door panel further includes hinges, each of which is attached to its respective hinge mounting surface portion of the inner panel and its respective hinge mounting raised portion of the internal reinforcing plate.
2. The door panel as claimed in claim 1, wherein:
   the hinge mounting surface portions of the inner panel and the hinge mounting raised portions of the internal reinforcing plate of the door panel are provided with bolt insertion holes, and
   the door panel further includes:
      nuts that are conjoined with the respective peripheries of the bolt insertion holes of a reverse surface which is in the other side with the inner panel of the hinge mounting raised portions of the internal reinforcing plate; and
      bolts adapted to be respectively screwed in the nuts through the bolt insertion holes of the inner panel and the bolt insertion holes of the internal reinforcing plate, thereby fixing the hinges that are in contact with the hinge mounting surface portions of the inner panel.
3. The door panel as claimed in claim 2, wherein:
   the hinge mounting surface portions of the inner panel and the hinge mounting raised portions of the internal reinforcing plate are respectively provided with positioning fitting portions having a protruding or indented shape so as to be capable of fitting to each other.
4. The door panel as claimed in claim 1, wherein:
   the hinge mounting surface portions of the inner panel and the hinge mounting raised portions of the internal reinforcing plate are respectively provided with positioning fitting portions having a protruding or indented shape so as to be capable of fitting to each other.

* * * * *